Jan. 20, 1953  H. E. SERNER  2,626,135
MIXING DEVICE
Filed April 20, 1951
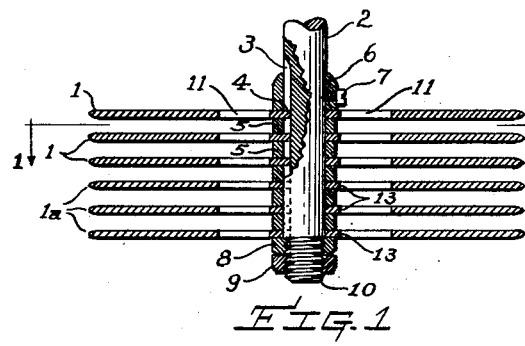
Fig. 1
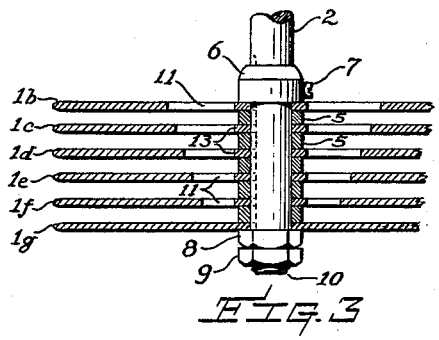
Fig. 3
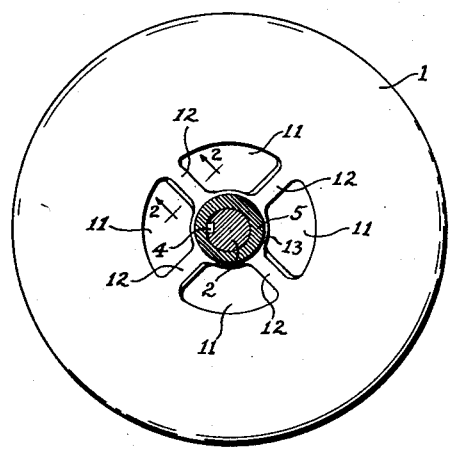
Fig. 2
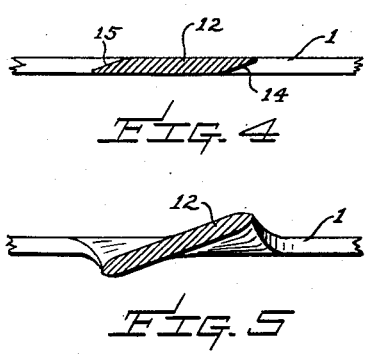
Fig. 4
Fig. 5
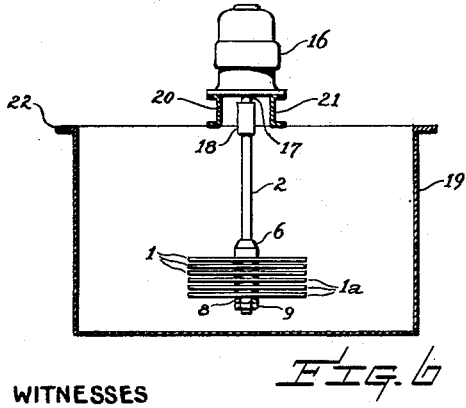
Fig. 6
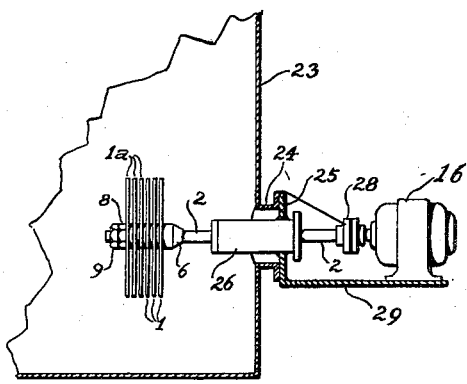
Fig. 7
WITNESSES
INVENTOR
BY Herbert Edward Serner
ATTORNEY Patented Jan. 20, 1953

2,626,135

UNITED STATES PATENT OFFICE 2,626,135

MIXING DEVICE

Herbert Edward Serner, Oakland, N. J.

Application April 20, 1951, Serial No. 221,979

6 Claims. (Cl. 259—106)

My invention relates to friction type disc impellers and relates more particularly to friction type disc impellers for mixing and/or agitating fluids such as liquids, or combinations of liquids and gases, or combinations of liquids and finely divided solids.

It is known to provide an impeller in the form of a rotor unit comprising a plurality of spaced, parallel concentric discs of equal outer diameter having central orifices of progressively decreasing diameter in the direction of axial flow of liquid into the rotor unit. Such a rotor unit conventionally has an imperforate terminal disc secured to the rotor shaft, the remaining orificed discs being spacedly secured to the first disc in one form of such device by bolts and spacers near the disc rim. The effective impelling surface in such a unit increases in the direction in which fluid enters the impeller, ostensibly to compensate for variation in suction requirements. However, the progressive increase in effective disc-surfaces increases traction through friction on the fluid being radially discharged in layers from between the elements and results in progressively higher discharge velocities for the successive radial passages, and progressively greater discharge volumes. Hence, the pressure between the discs becomes unbalanced and the desired effect of compensating for the suction requirements is counteracted. Moreover the use of bolts and spacers for securing the discs together adjacent the circumference interferes with the smooth flow of liquid between the discs and reduces the dynamic efficiency of the impeller. Also, the imperforate end or terminal disc offers, in the case of high speed operation on low viscosity liquids, a drag caused by the exposed end-surfaces. This drag causes a useless consumption of power, a reduction in the dynamic efficiency of the device, and limits the size of the discs that may be employed. The impeller effectiveness becomes less with increased liquid viscosiites, and it will cease to function in liquids of very high viscosity.

It is an object of my invention to provide a new and improved mixing and agitating device embodying annular impeller elements, capable of functioning effectively in liquids of any viscosity, even in semi-solids.

It is a further object of my invention to provide such a device in which the discharge velocity from all gap areas between elements will be equal; in which fluid pressures on both sides of each inner annulus, or ring of the device are equal so as to permit of all rings (except possibly the two end rings) being made of very thin materials; and in which the drag due to the exposed end-surfaces is greatly reduced, permitting operation without waste of power.

Other and further objects of my invention will appear from the following description, the accompanying drawings and the appended claims.

In general, and in accordance with my invention, a plurality of identical equal diameter impeller elements in the form of flat rings or annuli whose respective central orifices are of identical size and shape, are assembled in concentric, parallel and uniformly spaced relationship to each other upon and coaxially with a shaft to which the constant bore mixing head thus formed is secured for rotation as a unit. The shaft is adapted to be connected to any suitable prime mover such as an electric motor, a steam turbine, or any other suitable source of power for rotating the unit at the desired speed.

Each pair of annular impeller elements is spaced apart on the shaft by means of a single concentric spacer ring or washer. Each of the impeller elements is fashioned of relatively thin material except that the end impeller elements are preferably fashioned of thicker material in order to avoid undesirable flexing under the unbalanced fluid pressures acting on these elements. Because of this arrangement of impeller elements and spacer members, it is possible to alter the capacity of the device at will merely by reducing or increasing the number of impeller elements, or by changing their spacing by increasing or reducing the number of thin spacer rings (washers) between them. It is further preferred that the end impeller elements be beveled along their peripheral edges in order to avoid eddy currents and turbulence in the flow of liquid emerging from the periphery of the exposed disc surfaces. If the end elements are not beveled the resultant eddy currents at the disc periphery result in a substantial lowering of the impeller's effectiveness.

As a mixing apparatus in conjunction with a vessel holding a batch of fluid materials to be mixed, the device causes recirculation through the rotating identical annular elements of the fluid materials within the vessel. It produces a plurality of layers of the fluid materials moving outwardly between each pair of the rotating annular elements at different relative speeds and causes mixing of the materials of the layers by the friction of one layer upon another. At the same time, the fluid pressure on the opposite sides of each inner element is in balanced relationship.

In the accompanying drawings which form part of the instant specification and are to be read in conjunction therewith and in which like numbers refer to like parts throughout the several views:

Fig. 1 is a view in vertical section of a preferred and illustrative embodiment of a mixing device in accordance with my invention;

Fig. 2 is a view in section taken along the lines 1—1 of Fig. 1;

Fig. 3 is a view in section of a form of tapering bore impeller known to the prior art in which the central internal orifices are of progressively decreasing diameter in the direction of fluid flow into the impeller;

Fig. 4 is a fragmentary view in section through an impeller-spoke taken along the line 2—2 of Fig. 2;

Fig. 5 is a fragmentary view in section of a modified form of impeller-spoke in accordance with this invention;

Fig. 6 is a part sectional view in elevation of mixing apparatus in accordance with this invention in which the embodiment of Fig. 1 is depicted mounted for operation in vertical position in a tank or vessel adapted to contain fluid material to be mixed; and, Fig. 7 is a fragmentary view of apparatus corresponding to that depicted in Fig. 6 but with the device mounted in a horizontal position.

Referring now more particularly to the accompanying drawings, a series of flat annular impeller elements 1 and 1a are secured to a shaft 2, by means of a groove 3 in said shaft and projections 4 of the impeller elements. The elements 1 and 1a are of the same outside diameter and are held in parallel, concentric and uniformly spaced relation on the shaft 2 by means of spacer rings 5, a collar 6 which is secured to shaft 2 by means of set-screw 7 and a lock-nut arrangement consisting of threaded nuts 8 and 9 which engage the threaded end 10 of shaft 2.

The elements 1 and 1a are each provided with orifices 11, spokes 12 and hub 13. The orifices 11 in the wheel-like element thus formed collectively form a central fluid inlet opening in the element which opening is the same as to diameter, area and shape in each element and may be of whatever overall area is necessary to the obtainment for a given outside diameter of the requisite surface area in the ring shaped rim portion of the element.

The spokes 12 preferably have suitably bevelled edges 14 and 15 as is shown in Fig. 4 so that the spokes will offer minimum resistance to the axial flow of the fluid material passing through the impeller unit. An alternate spoke arrangement is shown in Fig. 5, the entire spoke member 12 being disposed at an acute angle to the plane of rotation in the direction of rotation of the elements 1, while spoke members 12 of elements 1a are disposed at a symmetrically opposite angle to assist by their resultant screw action in causing the fluid material to flow from both ends of the mixing head toward the center portion of the mixing head.

The spacer rings 5 may be of any suitable selected axial length so that the fluid-filled spaces between elements 1 and 1a may be increased or reduced to suit operating conditions. The device may be operated in any position, vertically as in the apparatus shown in Fig. 6 or horizontally as in Fig. 7 or in any intermediate position.

In the mixing apparatus shown in Fig. 6, the mixing unit with its impeller elements 1 and 1a has its shaft 2 operatively coupled to an electric motor 16 having a shaft extension 17 joined to the shaft 2 by means of a rigid coupling 18. The entire apparatus is shown as mounted on a tank 19 by means of horizontal support beams 20 and 21, which are securely mounted on the annular tank flange 22; the electric motor 16 being fastened by conventional means to the support beams 20 and 21.

In the mixing apparatus shown in Fig. 7, the mixing unit with its impeller elements 1 and 1a has its shaft 2 horizontally disposed and introduced into a tank 23 by means of a conventional combination of bearing and stuffing-box as indicated at 26. Shaft 2 is connected to motor 16 by means of coupling 28 and motor 16 is supported by base-plate 29 which is a rigid extension of flange 25. It will be understood that the use of my improved mixing device is not confined to single units; two or more such units may be mounted on a single shaft and two or more completely separate units may be used to agitate the fluid contents of a single vessel or tank.

In the prior art arrangement shown in Fig. 3, it will be noted that the central opening formed by the orifices 11 in each succeeding impeller element of the series 1b to 1f inclusive is smaller than the opening in the preceding element of the series, while impeller element 1g is solid so that the axial flow of fluid into the mixing head is restricted to the one direction from element 1b toward element 1g. More importantly however the varying diameter tapered central opening results in unbalanced fluid pressures being impressed in operation on the impeller elements 1b-1g inclusive. This, coupled with the drag caused by the excessive area of the imperforate end plate 1g presents the previously mentioned serious practical disadvantages to the use of the device as a high speed mixing unit in low viscosity liquids which are wholly avoided in the mixing device of my invention.

In the operation of the mixing apparatus shown in Fig. 6 for example, the fluid material enters the uniform bore of the rotating mixing head in an axial direction near the center of rotation through the central openings formed by the orifices 11 in the end impeller elements. As it enters the space between two adjacent elements, the flow becomes radial in a helical path. At the same time the surface friction of the elements on the fluid layer in contact with these surfaces accelerates the flow of the fluid. It is evident that the fluid layers in direct contact with the element surfaces must move faster than the other parallel fluid layers that are not in contact with the element surfaces. Therefore, the motion of the fluid is not uniform but is of a differential type throughout the distance that separates the two opposing elements, in a plane parallel to the axis of rotation; but a similar differential motion of the fluid also exists in a plane at right angle to the axis of rotation; since the outward path of the fluid is helical, and since the motion of the fluid is continuously accelerated as the fluid progresses from the center of the periphery of the impeller, the velocities of fluid elements differ with their radial distance from the center of rotation. In short, the action of the ring impeller creates a very large number of "shear-planes" within the fluid, with a very involved pattern and therefore most effective. This action might be compared with the action of a set of grind-stones and it is this action which effects mixing while the fluid is being propelled by the impeller.

Additionally, this exceptionally thorough mixing action is obtained in the use of my invention even in liquids of such high viscosity as to be characterized as semi-solids. Equal discharge velocities are obtained from all gap-areas and the pressures on both sides of each inner impeller element are made equal through the proper balancing of ring surface and peripheral velocity against discharge velocity, retention force and surface drag, made possible by the employment of a ring type impeller unit having a uniform diameter bore instead of a tapering bore. It is a basic consideration that the velocity head of the discharging fluid must be greater than the force with which the liquid tends to adhere to the impeller element surface. This force is a direct function of the liquid's viscosity. To make such an impeller function in viscous liquids, the effective impeller element area must be proportionately reduced, resulting in an annular or ring structure rather than in disc structure. In the case of low viscosity liquids, high speed operation with impellers having imperforate end discs results in much useless power being consumed by the exposed disc surface of the imperforate end disc. This not only reduces the dynamic efficiency of the device but also limits the size of the discs that may be employed. By the use of the ring type constant bore impeller unit of my invention, the impeller diameter can be substantially increased, because the drag caused by the exposed end surfaces is proportionately reduced.

The invention in its broader aspects is not limited to the specific steps, compositions, combinations and improvements described but departures may be made therefrom within the scope of the accompanying claims without departing from the principles of the invention and without sacrificing its chief advantages.

This application is a continuation-in-part of my copending application Serial No. 621,797, filed October 11, 1945, now abandoned.

I claim:

1. Mixing apparatus adapted to be immersed in a body of fluid materials to be mixed, comprising unencased coaxial, parallel and uniformly spaced annular impeller elements forming a mixing head of generally cylindrical contour mounted for rotation as a unit on its cylinder axis, the end elements of said mixing head being thickened and beveled around their peripheral edges and the central openings of said elements collectively forming a bore of substantially constant diameter extending axially and concentrically of said unit, for admitting the fluid materials to the spaces between said elements radially thereof, said annular impeller elements each being so proportioned as to inside and outside diameters and so spaced that the effective impelling surface area of said unit will be equal to that area at which the peripheral velocity head of fluid materials of a given viscosity admitted to and discharged from these spaces will be greater than the force with which said fluid materials tend to adhere to the surface of said elements over said area.

2. Mixing apparatus in accordance with claim 1 in which said bore is radially interrupted.

3. Mixing apparatus adapted to be immersed in a body of fluid materials to be mixed, comprising an unencased plurality of annular impeller elements, including thickened end elements, said end elements being beveled around their peripheral edges, of equal outside diameter disposed in uniformly spaced, concentric and parallel relation, said elements being mounted for rotation as a unit on a common axis concentric with said elements and substantially normal to the opposed faces of said elements, the central openings in said elements being substantially uniform in size and shape and collectively forming in said unit a bore of substantially constant diameter extending axially and concentrically of said unit for admitting the fluid materials to the spaces between said elements radially thereof, said spaces being free and unobstructed radially outwardly of said bore, said annular impeller elements each being so proportioned as to inside and outside diameters and so spaced that the effective impelling surface area of said unit will be equal to that area at which the peripheral velocity head of fluid materials of a given viscosity admitted to and discharged from these spaces will be greater than the force with which said fluid materials tend to adhere to the surface of said elements over said area.

4. Mixing apparatus adapted to be immersed in a body of fluid materials to be mixed, comprising an unencased series of circular impeller elements, including thickened end elements, said end elements being beveled around their peripheral edges, of substantially equal outside diameter, said elements having each an annular rim portion, a hub, and spoke members connecting said hub and said rim so as to provide an annular opening in each said element between said rim and said hub, the respective annular openings being of substantially equal area and of substantially uniform size and shape, said elements being disposed in uniformly spaced, concentric and parallel relation and being mounted for rotation as a unit on the common axis of said hubs, said annular openings collectively forming in said unit a bore of substantially constant diameter extending axially and concentrically of said unit, for admitting the fluid materials to the spaces between said elements radially thereof, said annular impeller elements each being so proportioned as to inside and outside diameters and so spaced that the effective impelling surface area of said unit will be equal to that area at which the peripheral velocity head of fluid materials of a given viscosity admitted to and discharged from these spaces will be greater than the force with which said fluid materials tend to adhere to the surface of said elements over said area.

5. Mixing apparatus adapted to be immersed in a body of fluid materials to be mixed, comprising a shaft; an unencased plurality of annular impeller elements, including thickened end elements, said end elements being beveled around their peripheral edges, of substantially equal outside diameter concentrically removably mounted on said shaft in spaced parallel relation to each other for rotation therewith as a unit and collectively forming a bore of substantially constant diameter concentric with said shaft for admitting the fluid materials to the spaces between said elements radially thereof; annular spacer members concentric with and removably mounted on said shaft between said elements serving to space said elements equally from each other, the spaces between said elements being free and unobstructed radially thereof; and, means for releasably securing said elements and said spacer members as a unit on said shaft, said annular impeller elements each being so proportioned as to inside and outside diameters and so spaced that the effective impelling surface area of said unit will be equal to that area at which the peripheral velocity head of fluid materials of a given viscosity admitted to and discharged from these spaces will be greater than the force with which said fluid materials tend to adhere to the surface of said elements over said area.

6. A mixing apparatus comprising a vessel to hold a batch of liquid materials to be mixed, and a mixing head within said vessel consisting of an unencased series of coaxial, parallel and uniformly spaced annular elements, including thickened end elements, said end elements being beveled around their peripheral edges, mounted for rotation on a common axis substantially normal to the opposed faces of said elements and collectively forming a bore of substantially constant diameter extending axially and concentrically of said common axis, for admitting the fluid materials to the spaces between said elements, said mixing head when rotating causing recirculation through said elements of the liquid materials within said vessel and producing a plurality of layers of said liquid materials moving outwardly between each pair of said rotating elements at different relative speeds and causing mixing of the materials of said layers by the friction of one layer upon another, said annular impeller elements each being so proportioned as to inside and outside diameters and so spaced that the effective impelling surface area of said unit will be equal to that area at which the peripheral velocity head of fluid materials of a given viscosity admitted to and discharged from these spaces will be greater than the force with which said fluid materials tend to adhere to the surface of said elements over said area.

HERBERT EDWARD SERNER.

REFERENCES CITED

The following references are of record in the file of this patent:

UNITED STATES PATENTS

| Number | Name | Date |
|---|---|---|
| 1,013,248 | Wilkinson | Jan. 2, 1912 |
| 1,061,142 | Tesla | May 6, 1913 |
| 1,399,740 | Bott | Dec. 13, 1921 |
| 1,693,170 | Alsop | Nov. 27, 1928 |
| 2,087,834 | Brown et al. | July 20, 1937 |
| 2,162,017 | Illsche | June 13, 1939 |
| 2,193,686 | Craddock | Mar. 12, 1940 |
| 2,321,907 | Gent | June 15, 1943 |

FOREIGN PATENTS

| Number | Country | Date |
|---|---|---|
| 599,519 | Germany | July 4, 1934 |